US011571781B2

(12) United States Patent
Takeda et al.

(10) Patent No.: US 11,571,781 B2
(45) Date of Patent: Feb. 7, 2023

(54) ELECTRIC TOOL

(71) Applicant: Koki Holdings Co., Ltd., Tokyo (JP)

(72) Inventors: Yuuki Takeda, Ibaraki (JP); Hironori Sakai, Ibaraki (JP)

(73) Assignee: Koki Holdings Co., Ltd., Tokyo (JP)

(*) Notice: Subject to any disclaimer, the term of this patent is extended or adjusted under 35 U.S.C. 154(b) by 360 days.

(21) Appl. No.: 16/801,190

(22) Filed: Feb. 26, 2020

(65) Prior Publication Data

US 2020/0189064 A1  Jun. 18, 2020

Related U.S. Application Data

(63) Continuation of application No. 15/568,796, filed as application No. PCT/JP2016/059688 on Mar. 25, 2016, now Pat. No. 10,596,679.

(30) Foreign Application Priority Data

Apr. 24, 2015  (JP) .............................. JP2015-089886

(51) Int. Cl.
*H02K 11/33* (2016.01)
*B24B 23/02* (2006.01)
(Continued)

(52) U.S. Cl.
CPC .............. *B24B 23/02* (2013.01); *B24B 55/00* (2013.01); *B25F 5/008* (2013.01); *B25F 5/02* (2013.01);
(Continued)

(58) Field of Classification Search
CPC .......... H02K 9/06; H02K 7/145; H02K 11/33; H02K 9/14; B25F 5/008; B25F 5/006;
(Continued)

(56) References Cited

U.S. PATENT DOCUMENTS 6,700,253 B1   3/2004 Ohnuma et al.
2009/0057006 A1   3/2009 Kishibata et al.
(Continued)

FOREIGN PATENT DOCUMENTS

CN   1143733   2/1997
CN   1945936   4/2007
(Continued)

OTHER PUBLICATIONS

"Search Report of Europe Counterpart Application", dated Feb. 11, 2022, pp. 1-8.
(Continued)

*Primary Examiner* — Leda T Pham
(74) *Attorney, Agent, or Firm* — JCIPRNET

(57) ABSTRACT

Provided is an electric tool in which the risk of short-circuiting between conductive members of multiple installed switching elements has been reduced by providing partitioning plates between the switching elements. An electric tool, which has a motor, an inverter circuit with multiple switching elements for performing switching operations and controlling the driving of the motor, a control unit for controlling switching element on-off operations, and a circuit board on which the switching elements are loaded, is configured so that the circuit board is housed inside a container-shaped case (40) and the circuit board is secured with a partitioning member (50) that is interposed between the multiple switching elements and has partitioning plates (51, 52*a*, 52*b*) obtained from an insulating material.

19 Claims, 6 Drawing Sheets

(51) Int. Cl.
  *H02K 7/14* (2006.01)
  *H02K 9/14* (2006.01)
  *B24B 55/00* (2006.01)
  *B25F 5/00* (2006.01)
  *B25F 5/02* (2006.01)
  *H02K 7/116* (2006.01)

(52) U.S. Cl.
  CPC .............. *H02K 7/145* (2013.01); *H02K 9/14* (2013.01); *H02K 11/33* (2016.01); *H02K 7/1163* (2013.01)

(58) Field of Classification Search
  CPC ..... B25F 5/02; B25B 21/002; B25B 23/1415; B24B 47/12; B24B 23/028; B24B 23/02; B24B 55/00
  See application file for complete search history.

(56) References Cited

U.S. PATENT DOCUMENTS

| | | | | |
|---|---|---|---|---|
| 2009/0229957 | A1* | 9/2009 | Nishimiya | B25F 5/008 200/292 |
| 2011/0171887 | A1* | 7/2011 | Tanimoto | H02K 5/207 310/50 |
| 2011/0227430 | A1* | 9/2011 | Omori | H05K 1/181 310/50 |
| 2015/0111480 | A1* | 4/2015 | Vanko | B24B 47/12 310/50 |
| 2016/0020676 | A1* | 1/2016 | Omura | B25F 5/008 310/50 |
| 2016/0375570 | A1* | 12/2016 | Boeck | G05B 19/4062 700/169 |

FOREIGN PATENT DOCUMENTS

| | | |
|---|---|---|
| CN | 101214644 | 7/2008 |
| CN | 101530994 | 9/2009 |
| CN | 102335895 | 2/2012 |
| CN | 102356483 | 2/2012 |
| CN | 102639301 | 8/2012 |
| CN | 102959826 | 3/2013 |
| CN | 104339324 | 2/2015 |
| EP | 2233382 | 9/2010 |
| EP | 2689897 | 1/2014 |
| JP | 2009124903 | 6/2009 |
| JP | 2012076179 | 4/2012 |
| WO | WO-2009145205 A1 * | 12/2009 .............. B25F 5/008 |

OTHER PUBLICATIONS

Office Action of China Counterpart Application, with English translation thereof, dated Jan. 26, 2022, pp. 1-9.

"Office Action of China Counterpart Application", dated Jun. 29, 2020, with English translation thereof, p. 1-p. 13.

"Search Report of Europe Counterpart Application", dated Jun. 30, 2020, p. 1-p. 5.

Office Action of China Counterpart Application, with English translation thereof, dated May 14, 2021, pp. 1-14.

"Office Action of China Counterpart Application", dated Aug. 24, 2022, with English translation thereof, pp. 1-17.

* cited by examiner

ELECTRIC TOOL

CROSS-REFERENCE TO RELATED APPLICATION

This application is a continuation application of the U.S. patent application Ser. No. 15/568,796, filed on Oct. 23, 2017, which is a 371 application of the International PCT application serial no. PCT/JP2016/059688, filed on Mar. 25, 2016, which claims the priority benefit of Japan Patent Application No. 2015-089886, filed on Apr. 24, 2015. The entirety of each of the above-mentioned patent applications is hereby incorporated by reference herein and made a part of this specification.

TECHNICAL FIELD

The disclosure relates to an electric tool which is driven by a motor, and particularly relates to a device for mounting an element in a power supply circuit and an inverter circuit.

BACKGROUND ART

There are known electric tools in which a brushless direct current motor (DC motor) is employed and a controller such as a microcomputer performs control over the rotation of a motor with high accuracy. The brushless DC motor detects a rotation position of a rotor using a magnetic sensor, and the controller controls a drive current supplied to a winding coil of the motor. Patent Document 1 discloses a technology as an example of an electric tool (grinder) employing a brushless DC motor. In Patent Document 1, the brushless motor is accommodated in a manner of being coaxial with a cylindrical housing. In the motor, a stator having a coil is disposed on an outer circumferential side, and a rotor core which rotates by means of a rotary shaft and holds a permanent magnet is provided on an inner circumferential side. The rotary shaft is pivotally supported by bearings on the front side and the rear side of the motor. A cylindrical sensor magnet for detecting the rotation position of the rotor is provided behind the rear bearing. The controller and a power supply circuit for controlling the motor are accommodated inside the housing on the rear side. In addition, an inverter circuit for supplying a rotating magnetic field (three-phase alternating current) to the coil of the motor is loaded. In an electric tool in which a brushless motor is loaded, switching elements such as field effect transistors (FETs) are required in order to drive the motor. Since the switching elements generate heat, the switching elements are required to be cooled using a cooling fan or the like. In the technology of Patent Document 1, the power supply circuit and the inverter circuit are loaded in circuit substrates independent from each other. In addition, the switching elements are loaded in the inverter circuit, and the switching elements are loaded at positions exposed to an air passage of cooling air generated by the fan.

CITATION LIST

Patent Literature

Patent Literature 1
Japanese Unexamined Patent Application Publication No. 2010-269409

SUMMARY OF DISCLOSURE

Technical Problem

In order to perform cooling using a cooling fan, the cooling fan is formed such that outside air is taken as cooling air from the outside of a housing and a switching element is exposed to the cooling air. However, depending on usage environments of an electric tool, outside air sometimes contains dust, moisture, or water droplets, and there is a risk that the substances will be taken into the housing together with air. Particularly, when the electric tool is a grinder, there are cases in which a grindstone grinds an iron material and there may be a risk that conductive dust such as iron powder will be taken into the housing and will be deposited around the switching element. Therefore, the front surface of the switching element is coated with an insulating material such as silicon. However, in such a case, the efficiency of cooling the switching element deteriorates.

The disclosure has been made in consideration of the foregoing background and an object thereof is to provide an electric tool in which an effect of cooling a switching element is improved and having a loading structure for the switching element which has excellent dustproof properties and reliability. Another object of the disclosure is to provide an electric tool in which a partition plate is provided between a plurality of loaded switching elements so that a risk of a short circuit between conductive members of the switching element is reduced.

Solution to Problem

The characteristics of the representative disclosure disclosed in this application are described as follows. According to an aspect of the disclosure, there is provided an electric tool including a motor; an inverter circuit which has a plurality of switching elements, performs a switching operation, and controls driving of the motor; a controller which controls an ON/OFF operation of the switching elements; and a circuit substrate in which the switching elements are loaded. A partition plate formed of an insulating material is interposed between the plurality of switching elements. A height of the partition plate from the circuit substrate is smaller than a height of the switching element from the circuit substrate.

According to another aspect of the disclosure, a container-shaped case having an opening portion and accommodating the circuit substrate is provided. The circuit substrate is fixed to the case when an inside of the case is filled with a resin. The partition plate is fixed to the case by means of the resin. At least a terminal part of the switching element is covered with the resin such that the switching element is partially covered with the resin. In addition, the electric tool further includes a housing in which the motor and the circuit substrate are loaded. The housing has an intake port for taking in outside air, a discharge port for discharging outside air, and a fan for taking in air through the intake port and causing cooling air to flow into the housing. The switching elements are disposed such that a surface direction of the switching elements is aligned in a direction in which the cooling air flows. Inside the housing, the case is loaded such that the opening portion faces a lower side. When the case is accommodated upside down as described above, dust is unlikely to be deposited around the switching elements.

According to further another aspect of the disclosure, the switching element is formed of a transistor which has three terminals and is sealed in a package. A heat radiation plate is provided on a rear surface of the package. The partition plate is disposed in a non-contact state with respect to the heat radiation plate. The inverter circuit employs six switching elements. An independent metal plate is provided on each of the heat radiation plates of three switching elements. A common metal plate is provided on each of the heat radiation plates of the three remaining switching elements. The partition plate is provided such that the independent metal plates are partitioned from each other. Moreover, the partition plate is provided such that the independent metal plate and the common metal plate are partitioned from each other. The partition plate is integrally molded using a synthetic resin and is temporarily fixed to the case or the circuit substrate before the inside of the case is filled with the resin.

Advantageous Effects of Disclosure

According to the disclosure, the heat radiation plates of the switching elements and the metal plates which are attached thereto are divided using partition plates formed of an insulating material. Therefore, it is possible to reduce a risk of a short circuit when conductive dust such as iron powder is taken into the housing and is deposited around the switching elements.

BRIEF DESCRIPTION OF DRAWINGS

FIG. 1 is a longitudinal sectional view illustrating the overall structure of an electric tool 1 according to an embodiment of the disclosure, and the black arrows indicate a flow of cooling air in a state in which a trigger switch is turned on.

DESCRIPTION OF EMBODIMENT

Embodiment 1

Figure 1:
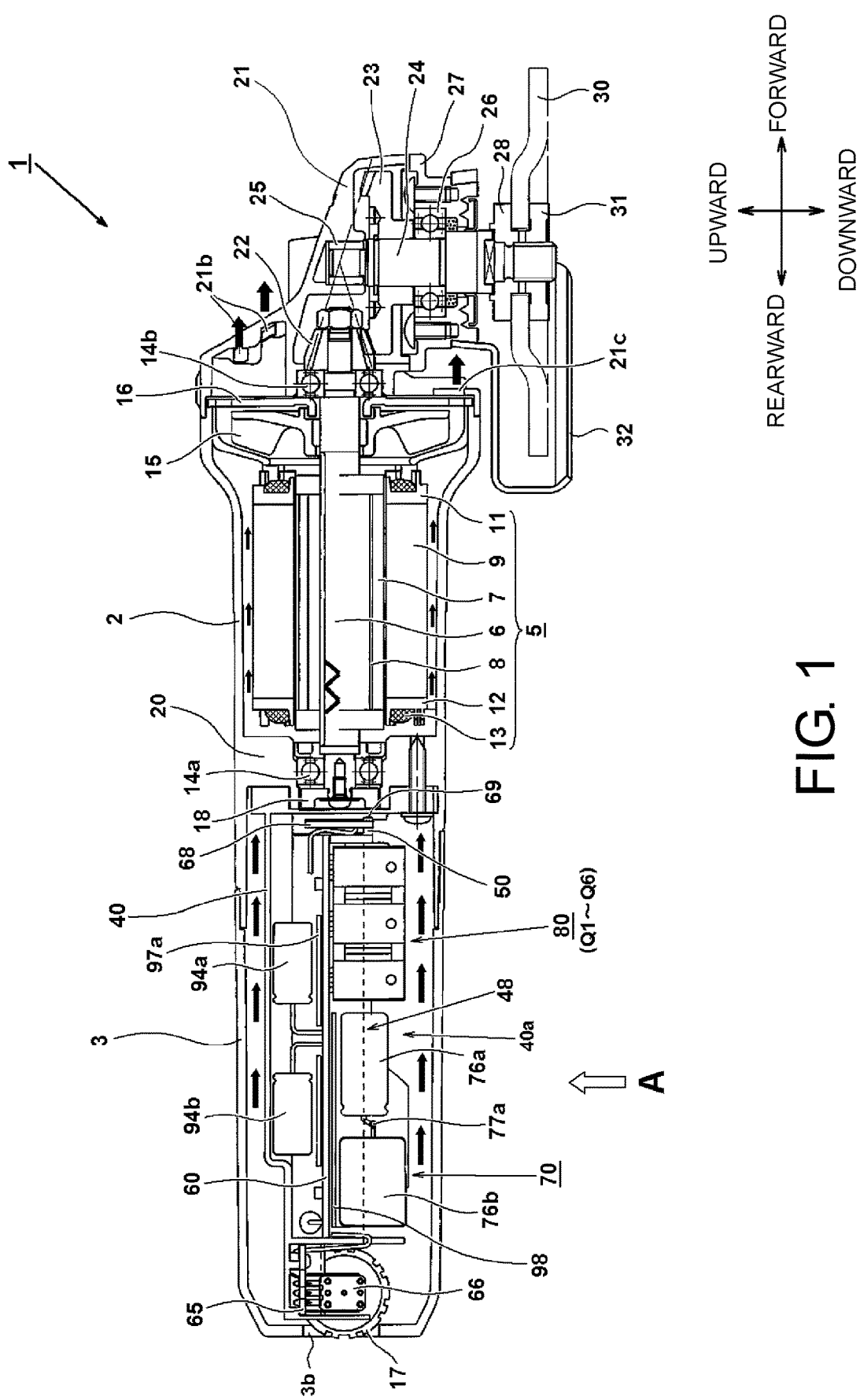

Hereinafter, an embodiment of the disclosure will be described based on the drawings. In the drawings below, the same reference signs will be applied to parts having the same functions, and descriptions thereof will not be repeated. In addition, in this specification, a forward/rearward direction, a rightward/leftward direction, and an upward/downward direction in description are as indicated in the drawings.

FIG. 1 is a top view of an electric tool 1 according to the embodiment of the disclosure. Here, as an example of the electric tool 1, FIG. 1 illustrates a disk grinder which is provided with a spindle 24 rotating in a direction orthogonal to a rotary shaft 6 of a motor 5 and in which a circular grindstone 30 serves as a working instrument connected to the spindle 24. A housing (outer frame or casing) of the electric tool 1 is constituted by three main components such as a gear case 21 which accommodates a power transmission mechanism, a cylinder-shaped motor housing 2 which accommodates the motor 5, and a rear cover 3 which is attached to the rear of the motor housing 2 and accommodates electrical instruments. The housing can be formed in an arbitrary manner. The housing may be constituted by three parts divided in the forward/rearward direction as in the present embodiment or may be formed in a shape divided in a different manner. The motor housing 2 is integrally formed of a resin or a metal and is formed in an approximately cylindrical shape having an opening on the front side. The inner diameter of the motor housing 2 is slightly greater than the outer diameter of a stator core 9 of the motor 5, and the outer surface side of the motor housing 2 forms a part which a worker grasps with one hand (grasping portion). The rear cover 3 is attached to the rear of the motor housing 2. The rear cover 3 is formed such that the rear cover 3 can be divided in the rightward/leftward direction on a vertical plane passing through the center axis in the longitudinal direction (extended line of the rotary shaft of the motor). Components on the right and the left are fixed at positions, between which the opening portion of the motor housing 2 on the rear side is interposed, by means of screws (not illustrated). In addition, the outer diameter of the rear cover 3 is substantially equal to or slightly smaller than the outer diameter of the motor housing 2.

In the motor 5, the rotary shaft 6 is disposed such that the rotary shaft 6 is aligned in a center axis direction (forward/rearward direction) of the motor housing 2. When a computation unit detects a rotation position of a rotor core 7 by means of a rotation position detecting element 69 constituted by a Hall integrated circuit (Hall IC), and when an inverter circuit 80 constituted by a plurality of switching elements Q1 to Q6 (refer to FIG. 2 described below) is controlled, driving power is successively supplied to a predetermined coil 13 of the motor 5 so that a rotating magnetic field is formed, and then a rotor rotates. The motor 5 is a so-called inner rotor-type three-phase brushless DC motor, in which the rotor rotates inside an inner circumferential side space of the stator core 9 having an approximately cylindrical shape. The stator core 9 is manufactured in a layered structure in which multiple thin annular iron plates manufactured through pressing are layered in the axial direction. Six teeth (not illustrated) are formed on the inner circumferential side of the stator core 9. Insulators 11 and 12 made of resin are mounted in the forward/rearward direction in the axial direction of each of the teeth. A copper wire is wound in a form in which the teeth are interposed between the insulators 11 and 12, thereby forming the coil 13. In the present embodiment, it is preferable that the coil 13 be subjected to star connection having three phases, such as a U-phase, a V-phase, and a W-phase. Three lead wires (not illustrated) for the U-phase, the V-phase, and the W-phase supplying driving power to the coil 13 are connected to a circuit substrate 60. The rotor core 7 is fixed to the rotary shaft 6 on the inner circumferential side of the stator core 9. The rotor core 7 is formed as a rotor core in which multiple thin annular iron plates manufactured through pressing are layered in the axial direction parallel to the axial direction. A flat plate-shaped permanent magnet 8 having an N-pole and an S-pole is inserted into a slot part having a rectangular cross section.

The rotary shaft 6 is rotatably held by a rear side bearing (the first bearing) 14a which is fixed to the motor housing 2, and a front side bearing (the second bearing) 14*b* which is fixed to a location in the vicinity of a connection portion between the gear case 21 and the motor housing 2. A cooling fan 15 is provided between the bearing 14*b* and the motor 5 when seen in the axial direction of the rotary shaft 6. For example, the cooling fan 15 is a centrifugal fan made of plastic. When the motor 5 rotates, the cooling fan 15 rotates in a manner of being synchronized with the rotary shaft 6, thereby generating a flow of air (cooling air) inside the housing for cooling the motor 5, the control circuit, and the like in the directions of the plurality of black arrows. The cooling air is suctioned through intake ports (not illustrated in FIG. 1 due to a reason related to the cross-sectional position) which are provided on both right and left side surfaces of the rear cover 3 in the vicinity of the rear end of the circuit substrate 60. The cooling air flows forward from behind and around a case 40 which accommodates the circuit substrate 60. The cooling air passes through an opening (refer to FIG. 3 described below) which is provided in a bearing holder portion 20 of the motor housing 2. Then, the cooling air flows into an accommodation space of the motor 5. The cooling air which has flowed into the accommodation space of the motor 5 is suctioned by the cooling fan 15 through a gap (refer to the black arrows in the drawing) with respect to the motor housing 2 on the outer circumferential side of the stator core 9 or the inner space of the stator core 9. The cooling air is discharged forward from a through-hole 21*b* of the gear case 21 through a through-hole of a fan cover 16, or forward from a hole 21*c* of the fan cover 16 on a lower side. In the present embodiment, the circuit substrate 60, a sensor magnet 18, the bearing 14*a*, the motor 5, the cooling fan 15, and the bearing 14*b* are disposed from the rear side (windward side) to the front side in series in the axial direction (on a straight line) when seen along the axial line of the rotary shaft 6 of the motor 5. Then, air holes (not illustrated) serving as the intake ports for taking in outside air are disposed on the rear side beyond elements generating lots of heat around the circuit substrate 60, particularly a diode bridge 72 and the switching elements Q1 to Q6 (refer to FIG. 2 described below). In this manner, in the present embodiment, when seen in the rotary shaft direction of the motor 5, the cooling air flows while being substantially in contact with the entire outer circumferential surface of the housing from the rear side toward the front side.

For example, the gear case 21 is formed of a metal such as aluminum through integral molding. The gear case 21 accommodates a set of bevel gear mechanisms (22, 23) and rotatably holds the spindle 24 serving as an output shaft. The spindle 24 is disposed such that the spindle 24 extends in a direction approximately orthogonal to (here, the upward/downward direction) the axial line direction (here, the forward/rearward direction) of the rotary shaft of the motor 5. A first bevel gear 22 is provided in a front end part of the rotary shaft 6, and the first bevel gear 22 meshes with a second bevel gear 23 which is attached to an upper end portion of the spindle 24. The second bevel gear 23 has a large diameter and has more gears than the first bevel gear 22. Therefore, the members of power transmission means act as deceleration mechanisms. An upper end side of the spindle 24 is pivotally supported by a metal 25 in the gear case 21 such that the spindle 24 is rotatable, and a location in the vicinity of the center thereof is pivotally supported by a bearing 26 constituted by a ball bearing. The bearing 26 is fixed to the gear case 21 via a spindle cover 27.

An attachment base 28 is provided at the tip of the spindle 24, and a tip tool such as the grindstone 30 is mounted by means of a washer nut 31. For example, the grindstone 30 is a resinoid flexible grindstone, a flexible grindstone, a resinoid grindstone, or a sanding disk having a diameter of 100 mm and is capable of front-surface grinding or curved-surface grinding with respect to a metal, a synthetic resin, marble, and concrete in accordance with the selection of a type of abrasive grain employed. The outer side and the upper side of the grindstone 30 in the radial direction on the rear side are covered with a wheel guard 32. The tip tool mounted on the electric tool 1 is not limited to only the grindstone 30. A different tool may be attached thereto, such as a bevel wire brush, a non-woven cloth brush, and a diamond wheel.

The sensor magnet 18 that is a magnetic body having magnetic poles different from each other in the rotation direction is attached to the rear end of the rotary shaft 6 of the motor 5. The sensor magnet 18 is a thin columnar permanent magnet which is attached in order to detect the rotation position of the rotor core 7 and in which an N-pole, an S-pole, an N-pole, and an S-pole (NSNS poles) are formed in order at intervals of 90 degrees in the circumferential direction. An approximately semi-circular sensor substrate 68 disposed in a direction perpendicular to the rotary shaft 6 is provided on the side to the rear of the sensor magnet 18, that is, in an inner part of the case 40, and the rotation position detecting element 69 which detects the position of the sensor magnet 18 is provided in the sensor substrate 68. The rotation position detecting element 69 detects the rotation position of the rotor core 7 by detecting a change in the magnetic field of the rotating sensor magnet 18. Three rotation position detecting elements 69 are provided at predetermined angles, 60° in this case, in the rotation direction.

The computation unit (will be described below) performing control over the rotation of the motor 5, the inverter circuit 80 for driving the motor 5, and a power supply circuit 70 for converting an alternating current, which is supplied from the outside through a power supply cord (not illustrated), into a direct current are accommodated inside the rear cover 3 formed in an approximately cylindrical shape. In the present embodiment, the circuits are loaded in the common circuit substrate 60. However, the circuits may be loaded in divided circuit substrates. The circuit substrate 60 is disposed such that the circuit substrate 60 becomes parallel to the center axis in the longitudinal direction (coaxial with the rotary shaft 6 of the motor 5) of the electric tool 1. Here, the circuit substrate 60 is disposed such that the front and rear surfaces of the substrate extend in the forward/rearward direction and the rightward/leftward direction. The circuit substrate 60 is disposed inside the container-shaped case 40 of which one surface is an opening portion 40*a*, and the circuit substrate 60 in its entirety is hardened by means of a hardening resin which hardens a liquid resin. Here, when the grindstone 30 of the electric tool 1 faces downward (when facing in the direction as in FIG. 1), the opening portion 40*a* of the case 40 is disposed such that the opening portion 40*a* thereof faces downward, and the plurality of switching elements Q1 to Q6 included in the inverter circuit 80 are disposed such that the switching elements Q1 to Q6 extend downward from the circuit substrate 60. The liquid level of the resin after being hardened is located at the position as indicated by the arrow 48, and approximately half of the switching elements Q1 to Q6 are positioned inside the resin, and the remaining half thereof are exposed without being covered with the resin. Here, the grinder according to the embodiment of the disclosure is a tool that mainly carries out work in which the grindstone 30 attached to the spindle 24 rotates and performs processing of grinding and abrading with respect to a processing material, so that chips or powder dust are generated during the processing. Accordingly, a worker causes the processing material to be positioned lower than himself/herself as much as possible such that powder dust or the like does not fall onto himself/herself. Therefore, in general, a worker carries out work without causing the spindle 24 to face upward but preferably causing the spindle 24 to face downward lower than the rightward/leftward direction. In this case, in the electric tool 1 (grinder) in which the disclosure is applied, the opening direction of the opening portion 40a of the case 40 is the same direction as the direction of the spindle 24 (protruding direction from the gear case 21). Therefore, generally, the opening direction of the opening portion 40a during work is facing downward. Accordingly, even when powder dust generated during processing infiltrates the inside of the rear cover 3 through the air hole, the powder dust is prevented from being accumulated inside the case 40. In addition, when work is completed, a worker places the electric tool 1 in his/her hand at a placement location such as the ground. Unless there is a special situation, the electric tool 1 is placed in the same direction as that when being held. That is, the electric tool 1 is placed in a state in which the spindle 24 faces downward. Therefore, for example, even if powder dust or the like enters the case 40 due to the influence of the cooling air, the powder dust inside the case 40 is eliminated due to the influence of gravity, when being placed down.

In the inverter circuit 80, the coil 13 is required to be energized with a large drive current. Therefore, for the switching elements Q1 to Q6, for example, an output transistor having a high capacity, such as a field-effect transistor (FET) and an insulated gate bipolar transistor (IGBT) is employed. Since the switching elements Q1 to Q6 generate a lot of heat, a heat radiation structure for improving the cooling effect is taken into consideration. In the present embodiment, a cooling metal plate is additionally attached to each of heat radiation plates of the switching elements Q1 to Q6. The heat radiation plates and the metal plates are disposed on the leeward (motor side) beyond the air holes (not illustrated) serving as the intake ports, thereby being directly exposed to the cooling air indicated by the black arrows. A power supply circuit is provided on the side to the rear of the switching elements Q1 to Q6. The power supply circuit 70 of the present embodiment is configured to include a rectifier circuit which converts a commercial power supply (alternating current) supplied from the outside into a direct current. Due to the efficiency of wiring, the power supply circuit 70 is loaded on the rear side of the case 40, that is, the rear side beyond the switching elements Q1 to Q6 (the non-motor side away from the motor 5) such that the power supply circuit 70 is closer to the power supply cord (not illustrated) which is wired in a manner of extending outward from the rear end surface of the rear cover 3.

In addition to the circuit substrate 60, the sensor substrate 68 having the rotation position detecting element 69 loaded therein is further provided in a space defined by the case 40 (inside the container). In addition, a switch substrate 65 is loaded and a variable resistor 66 adjusted by means of a gearshift dial 17 is provided outside the container part of the case 40, that is, on the rear side. The sensor substrate 68 is disposed orthogonal to the rotary shaft direction of the motor 5, and the switch substrate 65 is disposed parallel to the rotary shaft direction.

Figure 2:
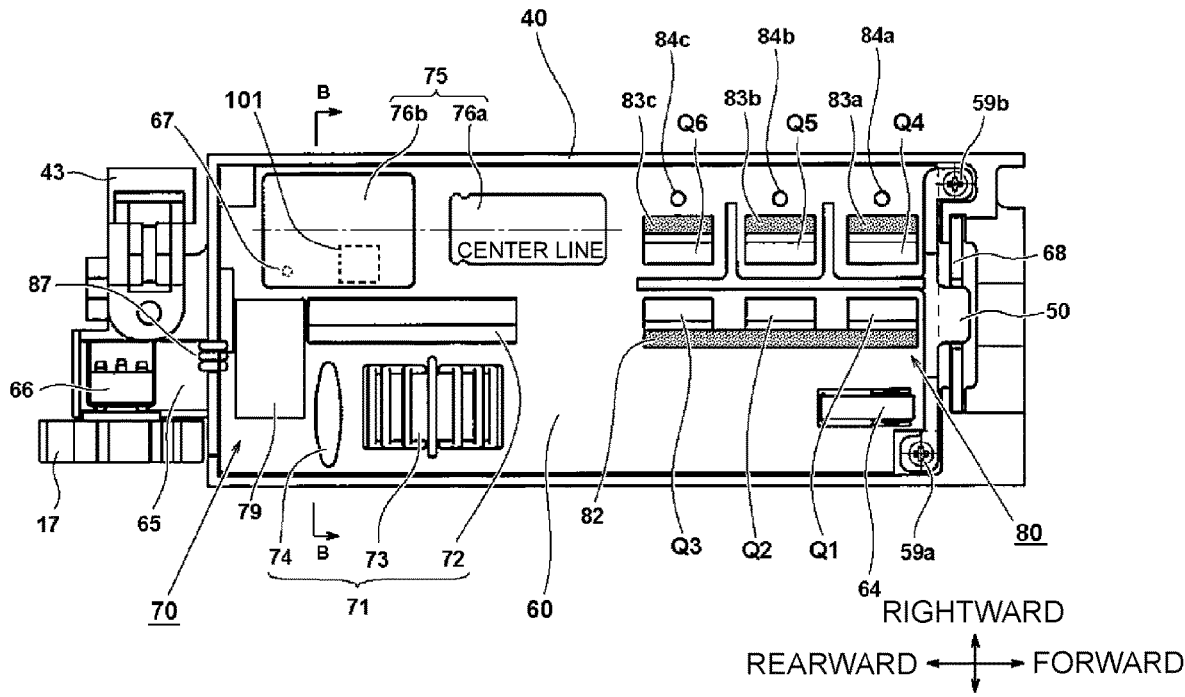
FIG. 2 is a view seen in the direction of an arrow A in FIG. 1 and illustrates a view of a case 40 and a circuit substrate 60.

FIG. 2 is a view seen in the direction of an arrow A in FIG. 1 and illustrates a view of the case 40 and the circuit substrate 60. The shape of the circuit substrate 60 accommodated inside the case 40 is formed along an outer contour substantially the same as the inner shape of the case 40. The circuit substrate 60 is immersed in a resin 48 which is hardened from a liquid state and is solidified (not illustrated). The circuit substrate 60 is mainly loaded with the power supply circuit 70 which is mainly constituted by a rectifier circuit 71 and a smoothing circuit 75, the inverter circuit 80 including six switching elements Q1 to Q6, a controller which controls the inverter circuit 80 and includes a microcomputer 101, and a constant voltage power supply circuit (not illustrated) generating a direct current having a constant voltage for the controller. The power supply cord (not illustrated) is connected to the input side of the circuit substrate 60 from the outside of the electric tool 1, and a commercial alternating current is input to the power supply circuit 70. A capacitor 79 is for noise reduction and is connected in parallel at a location in front of the rectifier circuit 71. The power supply cord is fixed by means of a power supply cord holding portion 43. Terminals 84a to 84c, that is, three lead wires (V-phase, U-phase, and W-phase; not illustrated) connected to the coil 13 of the motor 5 are individually soldered to the output side of the circuit substrate 60.

In the circuit substrate 60, due to the advantage in regard to the wiring being close to the input/output points and the point of being aligned with the flow of the cooling air, the power supply circuit 70 is disposed on the side to the rear of the circuit substrate 60, and the inverter circuit 80 is disposed on the side in front of the circuit substrate. The circuit substrate 60 is a print substrate having a single layer or multiple layers. Here, a multi-layer glass composite substrate is employed. The power supply circuit 70 is configured to include the rectifier circuit 71 and the smoothing circuit 75. The rectifier circuit 71 has the diode bridge 72, a choke coil 73, and a varistor 74. The smoothing circuit 75 has an electrolytic capacitor 76a, a film capacitor 76b, and a resistor 78 (described below). The terminals of electrolytic capacitor 76a and the film capacitor 76b are not directly soldered to the circuit substrate 60. After wiring is provided using extension wires such as lead wires, the terminals are fixed in a space open on the upper side of the circuit substrate 60.

In the inverter circuit 80, three switching elements Q1 to Q3 and three switching elements Q4 to Q6 are disposed in a manner of being respectively arranged in lines in the axial direction. In the switching elements Q1 to Q6, semiconductor elements are sealed in an approximately rectangular parallelepiped package formed of ceramic or the like, and three metal terminals extend from the lower side of the package. A heat radiation plate made of metal is embedded on the rear surface side of the package. The heat radiation plate has a planar shape, and the switching elements Q1 to Q6 are disposed such that the spreading direction of the planes becomes a direction horizontal and orthogonal to the longitudinal direction of the circuit substrate 60 (in FIG. 2, the forward/rearward direction). In addition, a metal plate 82 for heat radiation is further provided on the heat radiation plate on the rear surface of packages. Generally, IGBT collector terminals and FET drain terminals are conductively connected to the heat radiation plate on the rear surface side of the package. Therefore, in regard to the circuit configuration, when a collector terminal or a drain terminal is commonly connected, the common metal plate 82 is provided on the plurality of switching elements Q1 to Q3. On the other hand, the three remaining switching elements Q4 to Q6 in the inverter circuit 80 are disposed in a manner of being arranged in a line and are disposed parallel to the switching elements Q1 to Q3. A metal plate for heat radiation is provided on the heat radiation plates on the rear surfaces of the packages of the switching elements Q4 to Q6. However, since the collector terminals or the drain terminals thereof are not commonly connected, metal plates 83a to 83c independent from each other are provided. The surfaces of the metal plates 83a to 83c are disposed such that the surfaces are arranged in a direction horizontal and orthogonal to the longitudinal direction of the circuit substrate 60 (forward/rearward direction, that is, the rotary shaft direction of the motor). In this manner, since the surface direction of the heat radiation plates of the switching elements Q1 to Q6 is disposed such that the surface direction thereof is aligned along the direction in which the cooling air flows, the surfaces of the metal plates 83a to 83c on the sides opposite to the switching elements face a direction parallel to the direction in which the cooling air flows (refer to the black arrows in FIG. 1). Thus, it is possible to enhance the effect of heat radiation.

Moreover, the computation unit (not illustrated) for performing control over the rotation of the motor 5 is loaded in the circuit substrate 60. The computation unit is configured to include a microcomputer (not illustrated, and will hereinafter be referred to as a "microcomputer") and performs control over the starting, the stopping, and the rotation speed of the motor 5 by driving the inverter circuit 80. Furthermore, a trigger switch 64 which operates in association with the constant voltage power supply circuit (described below) and a trigger lever (not illustrated) is loaded in the circuit substrate 60. The members can be loaded in an arbitrary space on the circuit substrate 60. In the present embodiment, the microcomputer 101 is loaded in the vicinity of a location between the electrolytic capacitor 76a and the circuit substrate 60. The sensor substrate 68 having three rotation position detecting elements 69 (refer to FIG. 1) loaded therein is disposed on the side in front of the circuit substrate 60 in a manner of being orthogonal to the circuit substrate 60. The circuit substrate 60 and the sensor substrate 68 are fixed by means of a partition member 50. The partition member 50 serves as both a fixing member for causing the circuit substrate 60 to be held in the case 40, and a dividing member for providing a partition plate which prevents a short circuit between the switching elements in the switching elements Q1 to Q6. The partition member 50 is manufactured of an insulating material such as a synthetic resin. The partition member 50 is screwed to the case 40 by means of two screws 59a and 59b at screw boss parts on both end sides extending in the rightward/leftward direction. The circuit substrate 60 is screwed to the case 40 through a screw hole 67 on the rear side and is clamped by the partition members 50 on the front side, thereby being held in the case 40.

The switch substrate 65 having the variable resistor 66 loaded therein is provided on the rear side of the case 40. The switch substrate 65 is provided in an independent part which protrudes rearward from a container-shaped part of the case 40. The gearshift dial 17, which is partially exposed through an opening portion 3b (refer to FIG. 1) of the rear cover 3, is provided in the rotary shaft of the variable resistor 66. The circuit substrate 60 and the switch substrate 65 are wired by a lead wire 87.

Figure 3:
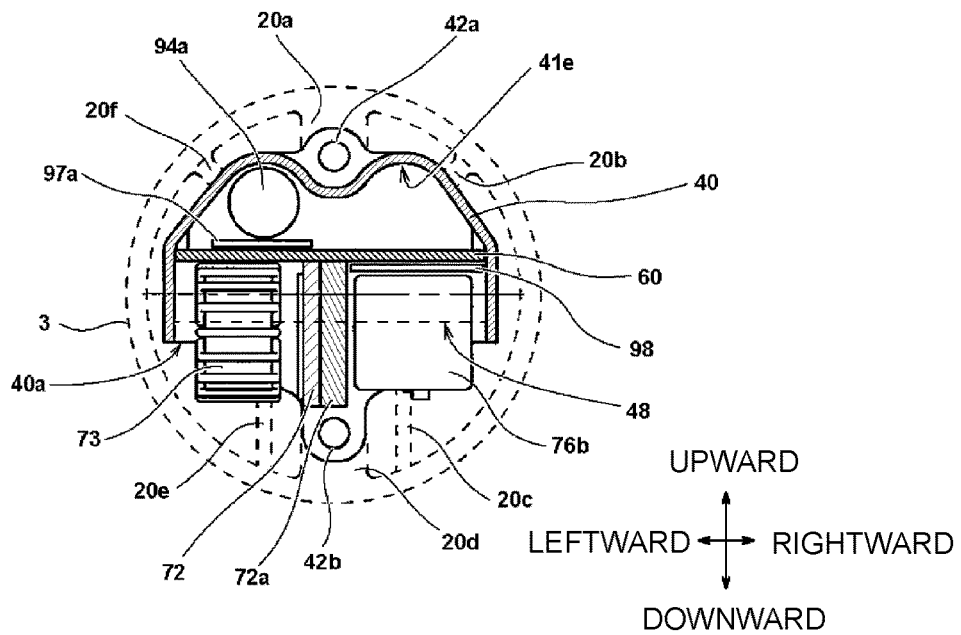
FIG. 3 is a cross-sectional view along a B-B portion in FIG. 2.

FIG. 3 is a cross-sectional view along a B-B portion in FIG. 2. The rear cover 3 is not illustrated. The case 40 has a container shape including the opening portion 40a and is formed such that liquid is not spilled when the internal space of the case 40 is filled with liquid. As described above, when the case 40 is disposed in the electric tool 1, the case 40 is disposed in an upside-down state such that the normal direction of the opening portion 40a faces downward (protruding direction from the gear case 21 of the spindle 24), in order to prevent water droplets or dust from being accumulated inside the case 40 as much as possible when water droplets or dust flows into the case 40 together with the cooling air. When the container-shaped case 40 is disposed inside the housing of the electric tool in an upside-down state, durability can be enhanced even though only approximately half of the switching elements Q1 to Q6 and the like are covered, instead of being completely covered with the resin. Particularly, when the electric tool 1 is placed in the direction of FIG. 1, iron powder, waste, and water droplets accumulated among the switching elements Q1 to Q6 are likely to fall to the lower surface inside the rear cover 3 due to the impact thereof.

Screw holes 42a and 42b for fixing the case 40 to the motor housing 2 by means of screws (not illustrated) are formed in the end portion of the case 40 on the front side. In the bearing holder portion 20 of the motor housing 2, a plurality of struts 20a to 20f are formed outward from the cylinder part holding outer wheel parts of the bearing 14a (refer to FIG. 1), and places other than the struts are formed as cavities, thereby realizing a structure in which the cooling air flows from the space accommodating the case 40 to the space accommodating the motor 5 side. The circuit substrate 60 is a double-sided substrate. The diode bridge 72, a heat radiation plate 72a, the choke coil 73, and the like are loaded on the side in front thereof (the lower surface in FIG. 3). The electrolytic capacitor 76a has an approximately columnar shape, and the film capacitor 76b has an approximately rectangular parallelepiped shape. However, the electrolytic capacitor 76a and the film capacitor 76b have arbitrary shapes. Capacitors having required capacities and preferable dimensions and shapes for being disposed in a limited space are selected.

The electrolytic capacitor 76a and the film capacitor 76b are fixed to the front surface of the circuit substrate 60 via an insulation sheet 98. This fixing is carried out by means of the resin 48 such as urethane filling the inside of the case 40. In this case, a plurality of electronic elements such as resistors having relatively small dimensions are loaded in the circuit substrate 60. The electrolytic capacitor 76a and the film capacitor 76b are fixed in a manner of covering the plurality of electronic elements. In other words, the plurality of electronic elements are disposed on the circuit substrate 60 in a manner of being interposed between the electrolytic capacitor 76a and the film capacitor 76b, and the circuit substrate 60. Due to this disposition utilizing a dead space inside the case 40, it is possible to effectively mount the elements configuring the circuits in the circuit substrate 60. In addition, since the insulation sheet 98 is interposed between the electrolytic capacitor 76a and the film capacitor 76b, and the electronic elements, both thereof can be prevented from being electrically connected to each other. In the disclosure, the plurality of electronic elements are configured to be interposed between the electrolytic capacitor 76a and the film capacitor 76b, and the circuit substrate 60. However, it is obvious that the above-described effects are achieved when at least part of the electronic elements are interposed therebetween.

The electrolytic capacitor 76a and the film capacitor 76b are disposed such that the capacitors are accommodated in an inner region of the case 40 when seen in a view in the direction of the arrow in the normal direction of the opening portion 40a (when seen as in FIG. 2). Preferably, the electrolytic capacitor 76a and the film capacitor 76b are disposed within the dimensions of the flat substrate surface of the circuit substrate 60. Accordingly, the electrolytic capacitor 76a and the film capacitor 76b do not stick out from the case 40, and the rear cover 3 accommodating the case 40 can be restrained from increasing in size. Moreover, all of the motor 5, the case 40, and accommodation members thereof can be accommodated within the outer diameter of the motor housing 2. Consequently, the housing becomes compact, and the electric tool 1 can be restrained from increasing in size. In addition, when seen in a cross-sectional view in the axial direction of the housing as in FIG. 3, most of the electrolytic capacitor 76a and the film capacitor 76b are positioned inside the housing and are disposed at a predetermined distance with respect to an inner wall of the housing (inner wall of the rear cover 3). In this case, consideration needs to be taken such that a flow of the cooling air is not disturbed due to the dispositions of the electrolytic capacitor 76a and the film capacitor 76b.

In regard to the resin 48, the case 40 is placed such that the opening portion 40a thereof faces upward, the inside of the case 40 is filled with a liquid resin, and the resin is hardened. Before the hardening is completed, the electrolytic capacitor 76a and the film capacitor 76b are dipped into the resin 48 half-way such that the capacitors are partially immersed at the liquid level thereof, and then the resin 48 is hardened. Therefore, the entire part inside the case 40 is filled with the resin from the part of a bottom surface 41e to the liquid level (dotted line portion). After the resin is hardened, the resin is firmly solidified. Therefore, the electrolytic capacitor 76a and the film capacitor 76b are stably held. Generally, the package of the electrolytic capacitor 76a and the film capacitor 76b is a non-insulating body, and the resin 48 itself is also a non-conductive material. Here, in order to more completely maintain the insulating state, an insulating member, in this case, the insulation sheet 98 is additionally interposed (may be omitted). In this manner, when the electrolytic capacitor 76a and the film capacitor 76b are loaded such that the capacitors are separated from the circuit substrate 60 and are fixed by means of the resin 48, it is possible to load a film capacitor in the upper parts of the electronic elements which are loaded on the circuit substrate 60 and have low heights, that are elements such as a large scale integration (LSI) and a microcomputer, for example.

An electrolytic capacitor 94a used for a constant voltage power supply circuit 90 is loaded on the rear surface of the circuit substrate 60. The electrolytic capacitor 94a is completely immersed in the resin and is then fixed. An insulation sheet 97a is interposed between the circuit substrate 60 and the electrolytic capacitor 94a so that the conductivity thereof is enhanced. However, the insulation sheet 97a may be omitted. The shape of the bottom surface 41e of the case 40 may be substantially parallel to the circuit substrate 60 with a slight distance therebetween immediately below the circuit substrate 60. In the present embodiment, a space in which the cylindrical electrolytic capacitor 94a can be accommodated is ensured on the lower side. The electrolytic capacitor 94a is disposed on only the left side. However, a capacitor may also be disposed in a space on the right side. In addition, the electrolytic capacitor 76a and the film capacitor 76b which are disposed on the front surface (lower side) of the circuit substrate 60 may be configured to be disposed on the rear surface of the circuit substrate 60. However, in this configuration, since a current output to a computation unit 100 is smaller than a current flowing in the inverter circuit 80, the electrolytic capacitors 94a and 94b do not generate a lot of heat compared to the electrolytic capacitor 76a and the film capacitor 76b, so that the necessity of cooling the capacitors is low. Therefore, the electrolytic capacitor 76a and the film capacitor 76b intended to be cooled with priority are exposed to the outside. In other words, rational dispositions of the capacitors are realized by causing a capacitor having a high heat quantity to be exposed to the outside, and causing a capacitor having a relatively low heat quantity to be completely buried in the resin 48. In this manner, the space between the circuit substrate 60 and the bottom surface 41e is a part which is filled with the resin 48 and is hardened. Therefore, it is preferable to determine the loading position or the loading method thereof in consideration of the degree of heat generation or the cooling effect.

Figure 4:
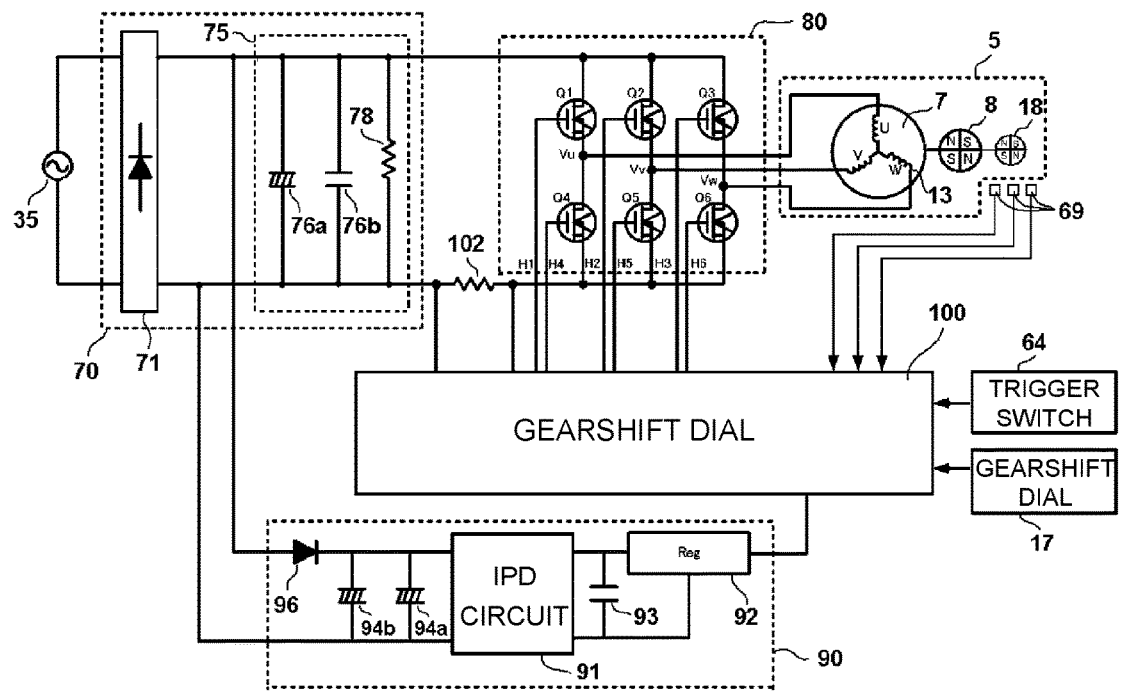
FIG. 4 is a block diagram illustrating a circuit configuration of a drive control system of a motor 5 in FIG. 1.

Next, a circuit configuration of a drive control system of the motor 5 will be described using FIG. 4. The power supply circuit 70 includes the rectifier circuit 71 which is constituted by the diode bridge 72 (refer to FIG. 2) and the like. The smoothing circuit 75 is connected to the output side of the power supply circuit 70, that is, a location between the rectifier circuit 71 and the inverter circuit 80. The inverter circuit 80 is configured to include the six switching elements Q1 to Q6, and a switching operation is controlled based on gate signals H1 to H6 supplied from the computation unit 100. An output of the inverter circuit 80 is connected to the U-phase, the V-phase, and the W-phase of the coil 13 of the motor 5. The constant voltage power supply circuit 90 is connected to the output side of the power supply circuit 70. Here, the circuits of the power supply circuit 70, the smoothing circuit 75, the inverter circuit 80, the constant voltage power supply circuit 90, and the computation unit 100 are collectively loaded on the same circuit substrate 60.

The power supply circuit 70 includes the rectifier circuit 71 which is mainly constituted by the diode bridge 72 (refer to FIG. 2). For example, the input side of the rectifier circuit 71 is connected to a commercial alternating current power supply 35, and the output side is connected to the smoothing circuit 75. In the rectifier circuit 71, an alternating current input from the commercial alternating current power supply 35 is subjected to full-wave rectification and then is output to the smoothing circuit 75. The smoothing circuit 75 is disposed between the rectifier circuit 71 and the inverter circuit 80 and smooths a pulsating flow included in a current rectified in the rectifier circuit 71 into a state close to a direct current, thereby outputting the smoothed current to the inverter circuit 80. The smoothing circuit 75 is configured to include the electrolytic capacitor 76a, the film capacitor 76b, and the discharging resistor 78. When the electric tool 1 is a disk grinder, the electric tool 1 requires a significant output compared to other electric tools (for example, an impact driver). Therefore, the value of a voltage input from the power supply circuit 70 to the smoothing circuit 75 also increases. Therefore, the capacitors (the electrolytic capacitor 76a and the film capacitor 76b) provided in the smoothing circuit 75 are required to have large electrostatic capacities. In the present embodiment, a method of fixing capacitors to the circuit substrate 60 is devised, so that a large-sized electrolytic capacitor 76a and a large-sized film capacitor 76b can be employed.

The electrolytic capacitor 76a is a capacitor having a polarity, and the film capacitor 76b is a capacitor having no polarity. When these capacitors are connected in parallel, the smoothing performance of the circuit is improved. The two capacitors are disposed between the output side of the rectifier circuit 71 and the input side of the inverter circuit 80. The inverter circuit 80 is configured to include the six switching elements Q1 to Q6 which are connected in a three-phase bridge form. Here, the switching elements Q1 to Q6 are metal oxide semiconductor field effect transistors (MOSFET). However, insulated gate bipolar transistors (IGBT) may be employed.

The rotor having the permanent magnet 8 rotates inside the stator core 9 of the motor 5. The sensor magnet 18 for detecting a position is connected to the rotary shaft 6 of the rotor. The computation unit 100 detects the rotation position of the motor 5 by causing the rotation position detecting element 69 such as a Hall IC to detect the position of the sensor magnet 18.

The computation unit 100 is control means for turning ON/OFF the motor and performing control over the rotation and is configured mainly using the microcomputer 101. The computation unit 100 is loaded in the circuit substrate 60 and controls the rotation speed of the motor 5 based on an activation signal which is input in accordance with an operation of the trigger switch 64, and a signal of the variable resistor 66 which is set using the gearshift dial 17. The computation unit 100 controls an energization time and a drive voltage with respect to coils U, V, and W. The computation unit 100 is connected to each of the gates of the six switching elements Q1 to Q6 in the inverter circuit 80 and supplies the drive signals H1 to H6 for turning ON/OFF each of the switching elements Q1 to Q6.

Each drain and each source of the six switching elements Q1 to Q6 in the inverter circuit 80 are connected to the U-phase, the V-phase, and the W-phase of the coil 13 subjected to star connection. Since the drain terminals of the switching elements Q1 to Q3 are connected to the positive pole side of the power supply circuit 70 in common, it is possible to provide the common metal plate 82 for heat radiation therefor. Meanwhile, since the drain terminals of the switching elements Q4 to Q6 are respectively connected to the terminals of the V-phase, the U-phase, and the W-phase of the motor, the metal plates 83a to 83c for heat radiation for the switching elements Q4 to Q6 are individually provided.

The switching elements Q1 to Q6 perform a switching operation based on the drive signals H1 to H6 input from the computation unit 100. The switching elements Q1 to Q6 supply a direct current voltage supplied from the commercial alternating current power supply 35 via the power supply circuit 70 and the smoothing circuit 75 to the motor 5 as three-phase (U-phase, V-phase, W-phase) voltages Vu, Vv, and Vw. The computation unit 100 detects the magnitude of a current supplied to the motor 5, by detecting the values of voltages at both ends of a current detection resistor 102 which is connected between the smoothing circuit 75 and the inverter circuit 80. A predetermined current threshold value is set in the computation unit 100 in advance in accordance with the set rotation of the motor 5. When a detected current value exceeds the threshold value, the switching operation of the inverter circuit 80 is stopped so that the motor 5 stops being driven. Accordingly, burnout or the like is prevented from occurring due to an overcurrent flowing in the motor 5.

The constant voltage power supply circuit 90 is a power supply circuit which is directly connected to the output side of the power supply circuit 70 and supplies a direct current with a stable reference voltage (low voltage) to the computation unit 100 constituted by a microcomputer or the like. The constant voltage power supply circuit 90 is configured to include a diode 96, the electrolytic capacitors 94a and 94b for smoothing, an intelligent power device (IPD) circuit 91, a capacitor 93, and a regulator 92. Each portion of the constant voltage power supply circuit 90 is loaded in the circuit substrate 60 (not illustrated in FIG. 2). The electrolytic capacitors 94a and 94b are loaded on the side to the rear of the circuit substrate 60. One electrolytic capacitor may be substituted for the electrolytic capacitors 94a and 94b when the capacitance allows.

Figure 5:
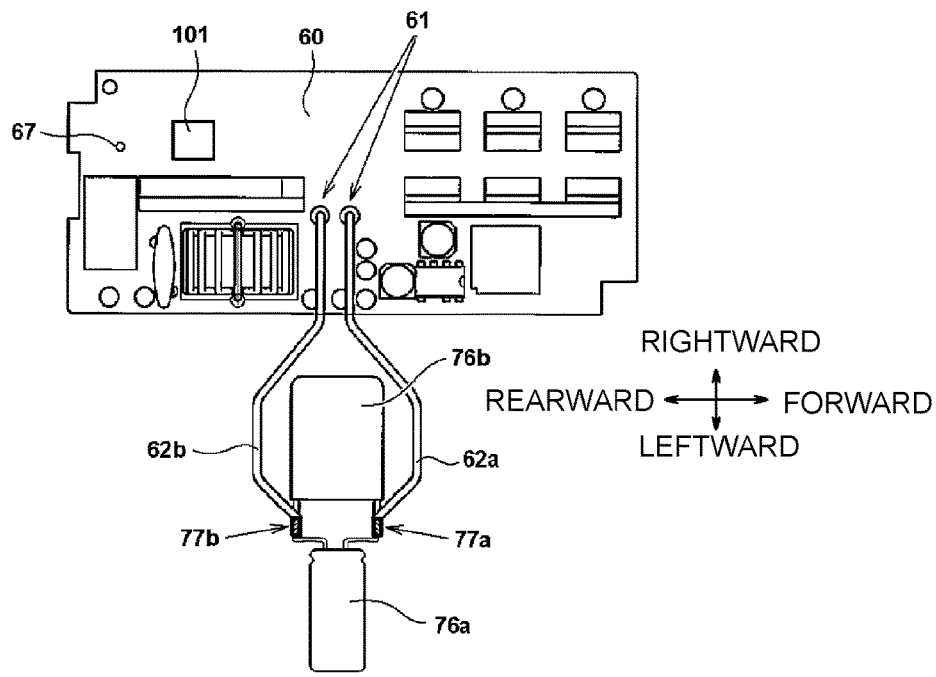
FIG. 5 is a front view of one circuit substrate 60 in FIG. 1.

FIG. 5 is a front view of one circuit substrate 60 in FIG. 1 and illustrates a view for describing a method of wiring the two of the electrolytic capacitor 76a and film capacitor 76b. Here, two lead wires 62a and 62b are lead out from a terminal 61 on the circuit substrate 60. The terminals of the electrolytic capacitor 76a and the film capacitor 76b are collectively connected to the tips of the lead wires 62a and 62b with solders 77a and 77b. As the lead wires 62a and 62b, vinyl wires that are insulated by coating solid wires or stranded wires with vinyl (vinyl coated wires) are employed. After the electrolytic capacitor 76a and the film capacitor 76b are connected to the lead wires 62a and 62b in parallel, the electrolytic capacitor 76a and the film capacitor 76b are fixed to locations in the vicinity of a vacant space on the front side surface of the circuit substrate 60 (surface on which the switching elements Q1 to Q6 are disposed). Here, the electrolytic capacitor 76a and the film capacitor 76b are fixed to locations in the vicinity of the place in which the microcomputer 101 is loaded.

As described above, in the electric tool 1 according to the present embodiment, since a large electrolytic capacitor 76a and film capacitor 76b are provided in the smoothing circuit 75, it is possible to efficiently prevent a peak current. In addition, since the wiring extends by means of the lead wires from the circuit substrate 60, the degree of freedom in the fixing positions of the electrolytic capacitor 76a and the film capacitor 76b is enhanced, so that it is possible to enhance the mounting efficiency of the circuit substrate 60.

Figure 6:
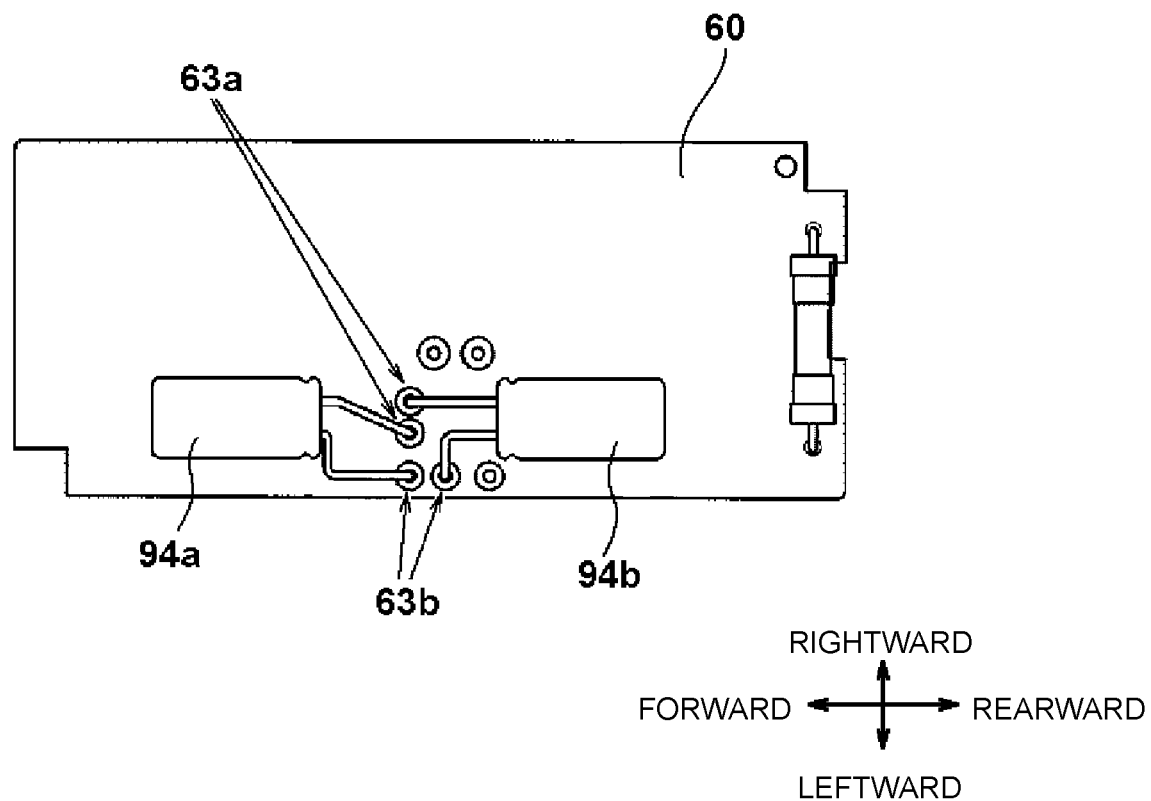
FIG. 6 is a rear view of one circuit substrate 60 in FIG. 1.

FIG. 6 is a rear view of one circuit substrate 60 in FIG. 1 and illustrates a view for describing a method of wiring the two electrolytic capacitors 94a and 94b. The terminals of the electrolytic capacitors 94a and 94b are directly soldered to terminals 63a and 63b on the side to the rear of the circuit substrate 60. In this case, the terminals of the electrolytic capacitors 94a and 94b are set to be sufficiently long. The terminals are bent such that the center axes of the cylindrical electrolytic capacitors 94a and 94b coincide with the longitudinal direction (forward/rearward direction) of the circuit substrate 60, and the positions of the electrolytic capacitors 94a and 94b are temporarily fixed. In this state, the electrolytic capacitors 94a and 94b are at positions along the curved bottom surface of the case 40. It is possible to dispose the electrolytic capacitors 94a and 94b for the constant voltage power supply circuit 90 by effectively utilizing the space on the rear surface side of the circuit substrate 60. Since there is another space between the rear surface of the circuit substrate 60 and the bottom surface 41e of the case 40, all or a part of the electrolytic capacitor 76a and the film capacitor 76b may be accommodated therein. However, since the electrolytic capacitor 76a and the film capacitor 76b have heat in a not insignificant amount due to a large current, when the heat radiation properties are considered to be important, it is advantageous that the electrolytic capacitor 76a and the film capacitor 76b are loaded on the front surface side of the circuit substrate 60 such that the capacitors are partially exposed to the cooling air from the resin 48.

Figure 7:
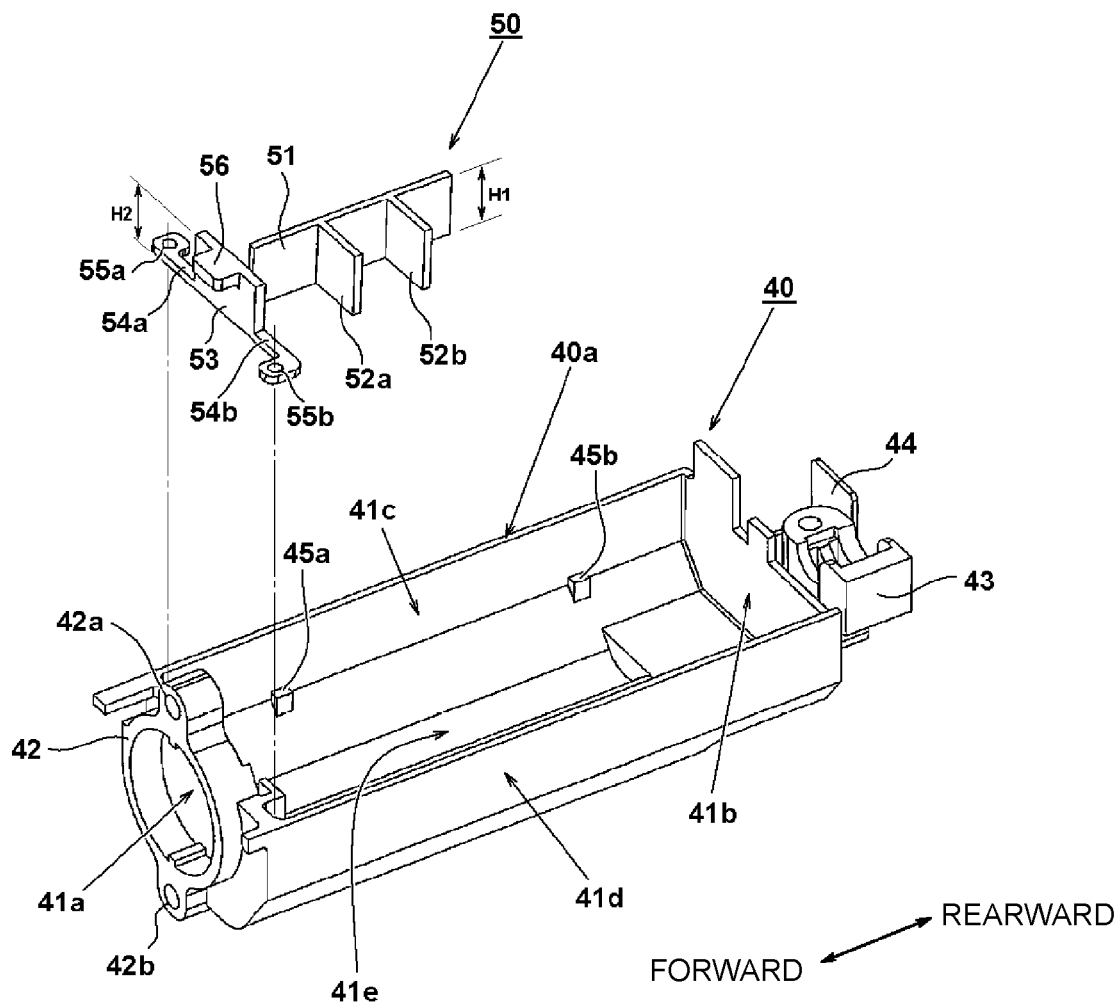
FIG. 7 is a perspective view illustrating shapes of the case 40 and a partition member 50 in FIG. 1.
Figure 8:
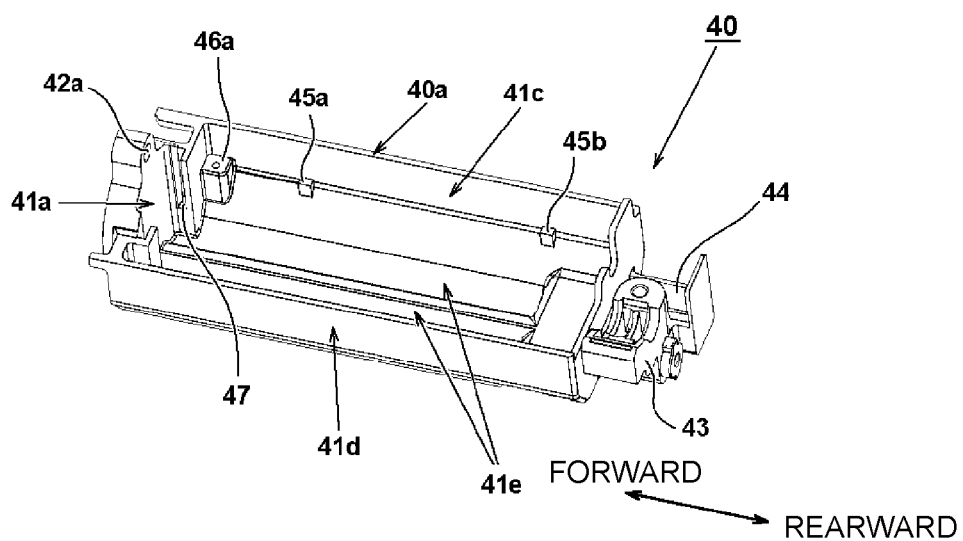
FIG. 8 is a perspective view of the case 40 in FIG. 1 seen at a different angle.
Figure 9:
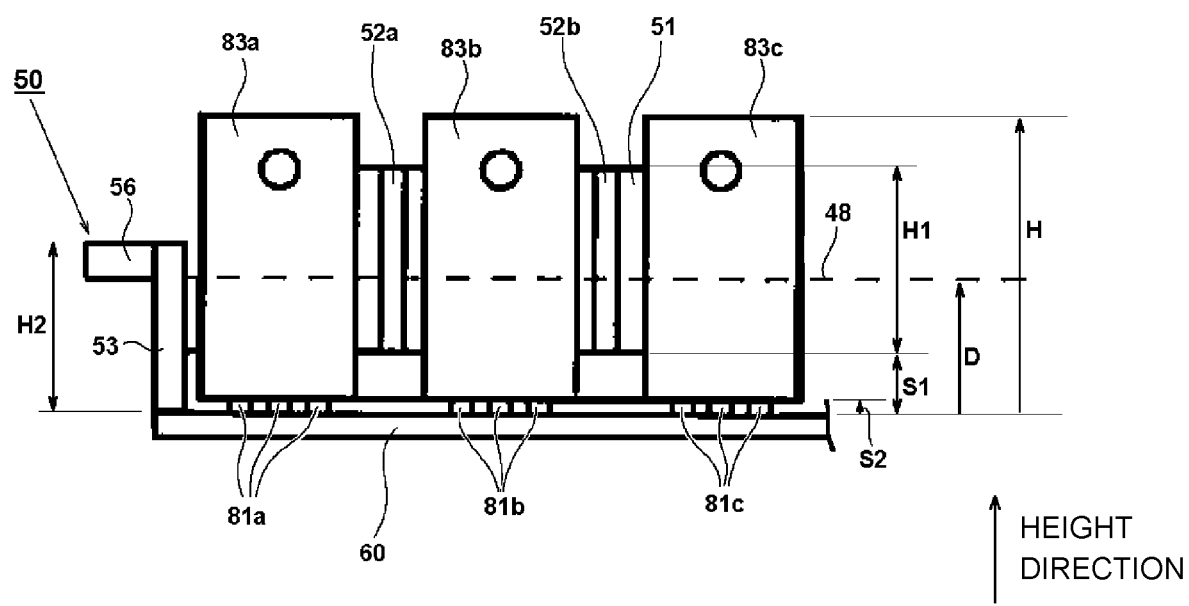
FIG. 9 is a view for describing a relationship among heights of switching elements Q1 to Q6, the partition member 50, and a resin 48.

Next, the shape of the case 40 and the shape of the partition member 50 will be described using FIGS. 7 and 8. The case 40 and the partition member 50 are manufactured of non-conductive materials. For example, the case 40 and the partition member 50 are manufactured of synthetic resins such as plastic through integral molding. FIGS. 7 and 8 are perspective views illustrating the opening portion 40a in the upward direction. The case 40 plays a role of an attachment base used for fixing the circuit substrate 60 to the housing of the electric tool 1. The case 40 formed in a container shape has a front surface 41*a*, a rear surface 41*b*, side surfaces 41*c* and 41*d*, and the bottom surface 41*e*. One remaining surface is formed as the opening portion 40*a*. The bottom surface 41*e* has a shape suitable for the electronic elements (here, the electrolytic capacitors 94*a* and 94*b*) to be loaded on the rear surface (side facing the bottom surface 41*e*) of the circuit substrate 60, and a part recessed in a curved surface shape is formed on the bottom surface 41*e*. In addition, joining portions between the side surfaces 41*c* and 41*d*, and the bottom surface 41*e* are not formed at right angles but are formed along the inner wall shape of the cylindrical rear cover 3. Here, the joining portions are connected through additional surfaces which are obliquely formed. A cylindrical tube portion 42 is formed in the outer part of the front surface 41*a*. The tube portion 42 is a recess part for internally accommodating the sensor magnet 18, so that the sensor substrate 68 is disposed on the inner side of the case 40 separated from the front surface 41*a* when seen from the sensor magnet 18. Protrusion parts protruding in the radial direction are formed in the cylindrical tube portion 42, and the screw holes 42*a* and 42*b* are respectively formed therein. Stepped portions 45*a* and 45*b* for supporting and positioning the circuit substrate 60 are formed inside the case 40, on the side surface 41*c*. Similarly, a stepped portion for positioning the circuit substrate 60 is also formed in the inner wall part of the side surface 41*d* which is hidden in FIG. 7. The power supply cord holding portion 43 and a switch substrate holding portion 44 are formed on the outer side of the rear surface 41*b* of the case 40.

A method of attaching the circuit substrate 60 in the case 40 having such a shape will be described. First, as illustrated in FIGS. 5 and 6, the electronic elements required for the circuit substrate 60 are loaded, and soldering is performed. The electrolytic capacitor 76*a* and the film capacitor 76*b* are brought into a connected state through the lead wires 62*a* and 62*b*. Next, the circuit substrate 60 loaded with the electronic elements is accommodated in the case 40 and is screwed to the circuit substrate 60 using the screw hole 67 (refer to FIG. 2) and a screw. A screw hole is formed at a position corresponding to the screw hole 67 of the bottom surface 41*e* (position hidden in FIG. 7). In this case, the sensor substrate 68 wired by means of a lead wire (not illustrated) is also fitted into a guide rail portion 47 formed on the inner side of the front surface 41*a* of the case 40. Similarly, the switch substrate 65 is attached to the switch substrate holding portion 44 on the rear side of the case 40. Next, the partition member 50 is attached such that the side portions on the side in front of the circuit substrate 60 are pressed and fixed.

The partition member 50 has a longitudinal partition plate 51 and two crosswise partition plates 52*a* and 52*b* extending in a crossing direction from the longitudinal partition plate 51. A plane-shaped pressing plate 53 extending in a direction orthogonal to the longitudinal partition plate 51 and the circuit substrate 60 is formed on the side in front of the longitudinal partition plate 51. Arm portions 54*a* and 54*b* extending in the rightward/leftward direction are formed in parts in contact with the circuit substrate 60 of the pressing plate 53. Screw holes 55*a* and 55*b* are formed in both end portions of the arm portions 54*a* and 54*b*. A pressing piece 56 is provided in a manner of extending forward from the side away from the circuit substrate 60 of the pressing plate 53 and holding the sensor substrate 68 such that the sensor substrate 68 does not fall off from the guide rail portion 47.

When the partition member 50 is screwed after being mounted inside the case 40 of the circuit substrate 60 and the sensor substrate 68, the circuit substrate 60 and the sensor substrate 68 are fixed to the case 40. After being screwed, the longitudinal partition plate 51 and the crosswise partition plates 52*a* and 52*b* are fixed in a non-contact state with respect to the heat radiation plates of the switching elements Q1 to Q6, and the metal plates 82, 83*a* to 83*c*.

Next, in a state in which the electrolytic capacitor 76*a* and the film capacitor 76*b* are temporarily placed on the outer side of the case 40, the resin 48 is caused to flow into the case 40 while the opening portion 40*a* of the case 40 faces the upper side, that is, as in FIG. 7. As the resin 48 to be caused to flow into the case 40, a hardening resin which is hardened from a liquid state, for example, a urethane resin is employed. Then, the resin 48 in a quantity with which the front surface and the rear surface of the fixed circuit substrate 60 are completely immersed is caused to flow into the case 40. Here, it is possible to fill the case 40 until the liquid level of the resin 48 reaches the opening surface of the opening portion 40*a*, but in order to reduce the weight and costs, the filling may be kept to the minimum necessary. In the present embodiment, the liquid level of the resin 48 is set to be at the halfway position in the upward/downward direction of the package of the switching elements Q1 to Q6 loaded on the front surface of the circuit substrate 60. At this liquid level position, when seen in the height direction (H1, H2) of the partition member 50, approximately half is immersed at this liquid level. Next, while the resin 48 is still in a liquid state, the electrolytic capacitor 76*a* and the film capacitor 76*b* are positioned at predetermined positions and are caused to be dipped into the liquid resin half-way. Then, the resin 48 is solidified in that state. Here, the predetermined position denotes that the electrolytic capacitor 76*a* and the film capacitor 76*b* are positioned within a region of the case 40 (inside the internal space) when seen in the normal direction (arrow A in FIG. 1) with respect to the opening surface of the opening portion 40*a* of the container-shaped case 40. Preferably, the electrolytic capacitor 76*a* and the film capacitor 76*b* are disposed such that the capacitors are completely accommodated within the region of the circuit substrate 60.

FIG. 8 is a perspective view of the case 40 seen at a different angle. A screw boss 46*a* is formed in a part which comes into contact with a screw hole 55*a* of the partition member 50. A similar screw boss (hidden in FIG. 8) is also formed in a part which comes into contact with a screw hole 55*b* of the partition member 50. The lower end position of part of the longitudinal partition plate 51 with a height H1 (refer to FIG. 7) of the partition member 50 fixed to the case 40 is above the lower surface position of a part of the pressing plate 53 with a height H2. This is because the pressing plate 53 and the arm portions 54*a* and 54*b* are directly placed on the case 40 at the front end portion of the circuit substrate 60, in contrast to the longitudinal partition plate 51 and the crosswise partition plates 52*a* and 52*b* which are disposed on the circuit substrate 60 with a predetermined distance therebetween. Therefore, the circuit substrate 60 is clamped by the pressing plate 53 and the case 40. The circuit substrate 60 may be fixed to the case 40 by means of a common screw jointly fastening the circuit substrate 60 and the partition member 50, instead of being fixed in a manner of being interposed between the partition member 50 and the case 40.

Next, a relationship between the heights of the switching elements Q1 to Q6 and the partition member 50, and the filling amount of the resin 48 will be described using FIG.

9. The metal plate 83a having the same height H from the front surface of the circuit substrate 60 is screwed to the rear surface of the switching element Q4. First, the metal plate 83a is fixed to the switching element Q4 using a screw (not illustrated). Thereafter, three legs 81a of the switching element Q4 are inserted through the through-hole of the circuit substrate 60 and are then soldered. Similarly, the metal plates 83b and 83c are also screwed to the switching elements Q5 and Q6. Thereafter, three legs 81b and three legs 81c are inserted through the through-hole of the circuit substrate 60 and are then soldered. Here, the lower end seen in the height direction of the metal plates 83a to 83c is caused to be separated from the circuit substrate by a predetermined distance S2. In regard to the partition member 50, the heights H1 of the longitudinal partition plate 51 and the crosswise partition plates 52a and 52b are configured to be smaller than the height H after the switching elements Q4 to Q6 are attached to the circuit substrate 60. The lower surface of the longitudinal partition plate 51 and the crosswise partition plates 52a and 52b in the height direction are caused to be separated from the front surface of the circuit substrate 60 by a predetermined distance S1. This is because a set of the switching element Q4 and the metal plate 83a, a set of the switching element Q5 and the metal plate 83b, and a set of the switching element Q6 and the metal plate 83c, which are parts to be partitioned from each other, are parts on the side above a height D in the height direction, to which the resin 48 is filled. In addition, the upper end positions of the longitudinal partition plate 51 and the crosswise partition plates 52a and 52b in the height direction are made lower than the heights of the switching elements Q4 to Q6, in order to improve the heat radiation properties by allowing the switching elements Q4 to Q6 to be easily exposed to the cooling air, and moisture, dust, and the like are likely to be deposited because the substances are collected in the liquid level part of the resin 48. Naturally, the upper end positions of the longitudinal partition plate 51 and the crosswise partition plates 52a and 52b in the height direction and the heights of the switching elements Q4 to Q6 may coincide with each other. However, when the degree of partitioning is raised, the effect of causing the metal plates 83a to 83c to be exposed to the cooling air is reduced and the cooling properties deteriorate. Accordingly, in consideration of the balance therebetween and considering the height H1 of the partition plate, which portion of the height H the height H1 makes up should be taken into consideration.

In the present embodiment, the terminal parts of the switching elements Q1 to Q6 are covered with the resin 48. Meanwhile, approximately half the metal plates 83a to 83c are exposed to the outside from the resin 48 when seen in the height direction, and the upper end positions are higher than the upper end positions of the partition plates. Therefore, it is possible to obtain a preferable cooling effect. In addition, since the electrolytic capacitor 76a and the film capacitor 76b are also exposed to the outside from the resin at the same time, it is possible to obtain a preferable cooling effect with respect to the electrolytic capacitor 76a and the film capacitor 76b. Moreover, when the circuit substrate 60 is accommodated inside the housing of the electric tool 1, the switching elements Q1 to Q6 are disposed in an upside-down state. Therefore, a risk of moisture or dust such as iron powder being deposited inside the divisions partitioned by the longitudinal partition plate 51 and the crosswise partition plates 52a and 52b is reduced, and thus, it is possible to realize an electric tool having high reliability and a long life span.

Hereinabove, according to the present embodiment, the circuit substrate 60 is accommodated inside the container-shaped case 40, the inside thereof is filled with the resin 48, and the circuit substrate 60 is completely or substantially completely immersed therein. Therefore, it is possible to significantly enhance the waterproof properties and the dustproof properties of the circuit substrate 60. In addition, since the capacitors are disposed on the substrate and are fixed by means of the resin 48 having hardening properties, it is possible to stably fix the capacitors inside the case 40 even if the capacitors are large in dimensions and weight. In this case, since a portion of the capacitors is exposed from the resin 48, the capacitors can be exposed to the cooling air and can be cooled. In addition, since the capacitors are disposed on the substrate via the lead wires, the degree of freedom in disposing the capacitors increases, so that the degree of freedom in disposing the elements on the circuit substrate 60 increases. In addition, since another circuit element such as a microcomputer is disposed between the circuit substrate 60 and the capacitors, it is possible to dispose the elements while effectively utilizing the space without any loss. In addition, since a liquid resin is caused to flow in and is hardened therein, there is no risk of an occurrence of uneven coating in contrast to the work of coating using a gel resin. Moreover, since the switching elements Q1 to Q6 generating a lot of heat are partially exposed to the outside from the resin 48, it is possible to cause the switching elements Q1 to Q6 to be preferably exposed to the cooling air within an air passage and to maintain the cooling effect. In this case, the partition members formed of an insulating material are interposed between members between which it is not preferable to have a short circuit due to metal powder and the like. Therefore, it is possible to realize an electric tool having high durability and reliability.

Hereinabove, the embodiment has been described based on the disclosure. However, the disclosure is not limited to the above-described embodiment, and various changes can be made within a scope not departing from the gist thereof. For example, in the above-described embodiment, the terminals of the capacitors are connected to the substrate via the lead wires for the purpose of extending the terminals. However, it is possible to accommodate a configuration in which the terminals of the capacitor main bodies are extended. In addition, the configuration is acceptable as long as the partition plate is interposed between at least two switching elements. One sheet of the partition plate may be provided such that only the space between the switching elements Q1 to Q3 and the switching elements Q4 to Q6 are partitioned. In this manner, the cooling air flows toward the switching elements more efficiently. In addition, in the above-described embodiment, the cooling air is configured to flow through the air holes (not illustrated) such that the cooling air comes into contact with the entire inner circumferential surface of the housing. However, the cooling air may be configured to flow in only the opening portion side in the case accommodation part. In this manner, the cooling air can be concentrated on the switching elements. In addition, in the above-described embodiment, the opening direction of the case is set to be the same direction as the protruding direction of the spindle. However, the configuration is acceptable as long as the opening direction of the case faces downward when the electric tool is in a placed state. In addition, in the above-described embodiment, as an example of the electric tool 1, a loading example for a circuit substrate used in a grinder has been described. However, a similar circuit substrate can also be applied to other electric tools in a similar manner without being limited to only a grinder. For example, a similar circuit substrate can also be applied to saber saws, multi-cutters, hand drivers having a cylindrical housing, and impact drivers in a similar manner.

The invention claimed is:

1. An electric tool comprising:
a motor having a rotary shaft extending in a front-rear direction;
a housing which accommodates the motor;
a spindle which is configured to protrude in a protruding direction orthogonal to the front-rear direction from the housing and to which a tip tool is detachable;
an inverter circuit which has a plurality of switching elements, performs a switching operation, and controls a driving of the motor;
a controller which controls an ON/OFF operation of the plurality of switching elements;
a circuit substrate disposed at a rear side of the motor in which the plurality of switching elements are loaded; and
a case which accommodates the circuit substrate, wherein a resin is filled in an inside of the case;
wherein the plurality of switching elements are loaded on a surface of the circuit substrate so that at least a part of the switching element protrudes from the resin to a tip tool side in the protruding direction.

2. The electric tool according to claim 1,
wherein another part of the plurality of switching elements is covered by the resin and the part of the plurality of switching elements is positioned outside the resin.

3. The electric tool according to claim 2,
wherein in each of the plurality of switching elements, at least a terminal part of each of the plurality of switching elements is covered with the resin.

4. The electric tool according to claim 2,
wherein the housing has an intake port for taking in outside air, and a fan for taking in air through the intake port and causing a cooling air to flow into the housing,
wherein a metal plate for heat radiation is connected to the plurality of switching elements, and the metal plate is directly exposed to the cooling air.

5. The electric tool according to claim 4,
a portion of the metal plate is coved by the resin and another portion of the metal plate is protruding from the resin to the tip tool side in the protruding direction.

6. The electric tool according to claim 1, further comprising:
a smoothing circuit which has a capacitor is disposed on the circuit substrate,
wherein the capacitor is connected to the circuit substrate by using an extension wire and fixed in an inside of the housing such that the capacitor is extending along the front-rear direction.

7. The electric tool according to claim 5,
wherein the capacitor is fixed to the case by the resin filled inside the case.

8. The electric tool according to claim 6,
wherein at least a part of the capacitor is overlapped to the circuit substrate in the protruding direction.

9. The electric tool according to claim 1,
wherein each of the plurality of switching elements has a rear surface which is connected to a heat radiation member and a front surface which is opposite to the rear surface,
wherein the plurality of switching elements are disposed in a manner that three switching elements and other three switching elements are respectively arranged in lines in the front-rear direction with the front surfaces of the three switching elements facing to the front surfaces of the other three switching elements.

10. The electric tool according to claim 1,
wherein a trigger switch which transmits an activation signal for activating the motor to the controller which is loaded on the circuit substrate.

11. The electric tool according to claim 1,
further comprises a rectifying element connected to a commercial alternating current power supply and the smoothing circuit, wherein the rectifying element loaded on the tip tool side of the circuit substrate in the protruding direction.

12. The electric tool according to claim 1,
wherein a cooling air flows through a space disposed below the tip tool side of the circuit substrate in the protruding direction.

13. The electric tool according to claim 1, further comprises a guard,
wherein the tip tool is disk like shape and rotate with the spindle,
wherein the guard covers a part of the tip tool.

14. The electric tool according to claim 1, wherein the housing has a motor housing accommodating the motor and a rear cover which is connected to a rear side of the motor housing and covers the case.

15. An electric tool comprising:
a motor having a rotary shaft extending along a front-rear direction;
a housing which accommodates the motor;
a spindle which is configured to protrude along a downward direction orthogonal to the front-rear direction from the housing;
an inverter circuit which has a plurality of switching elements, performs a switching operation, and controls a driving of the motor;
a controller which controls an ON/OFF operation of the plurality of switching elements;
a circuit substrate extending along the front-rear direction in which the plurality of switching elements are loaded;
a heat radiation element connected to the switching element; and
a case which supports the circuit substrate, the plurality of switching elements and the heat radiation element by a resin which is filled in an inside of the case;
wherein at least one of a part of the heat radiation element or a part of the plurality of switching elements is protruding along the downward direction from the resin in the case.

16. The electric tool according to claim 15,
wherein the part of the heat radiation element or the part of the plurality of switching elements is disposed in a cooling air path.

17. The electric tool according to claim 15,
wherein the heat radiation element is extending along the front-rear direction, and is cooled by a cooling air flowing along the front-rear direction.

18. The electric tool according to claim 15, further comprises a tip tool which is a disk like shape and is attached to the spindle, and a guard covers a part of the tip tool.

19. The electric tool according to claim 15, wherein the housing has a motor housing accommodating the motor and a rear cover which is connected to a rear side of the motor housing and covers the case.

* * * * *